United States Patent
Kankale et al.

(10) Patent No.: US 12,528,987 B2
(45) Date of Patent: Jan. 20, 2026

(54) SOIL WETTING COMPOSITION

(71) Applicant: Momentive Performance Materials Inc., Waterford, NY (US)

(72) Inventors: Mayur Kankale, Nashik (IN); Kawar Lal Dabodhia, New Delhi (IN); Sushilkumar Bahuguna, Uttar Pradesh (IN); Subhasis Bhattacharjee, Mumbai (IN)

(73) Assignee: Momentive Performance Materials Inc., Waterford, NY (US)

( * ) Notice: Subject to any disclaimer, the term of this patent is extended or adjusted under 35 U.S.C. 154(b) by 558 days.

(21) Appl. No.: 18/017,164

(22) PCT Filed: Jul. 28, 2021

(86) PCT No.: PCT/US2021/043400
§ 371 (c)(1),
(2) Date: Jan. 20, 2023

(87) PCT Pub. No.: WO2022/026515
PCT Pub. Date: Feb. 3, 2022

(65) Prior Publication Data
US 2023/0257652 A1  Aug. 17, 2023

(51) Int. Cl.
*C09K 17/38* (2006.01)
*C05C 9/02* (2006.01)
*C05G 3/80* (2020.01)

(52) U.S. Cl.
CPC ............ *C09K 17/38* (2013.01); *C05C 9/02* (2013.01); *C05G 3/80* (2020.02)

(58) Field of Classification Search
CPC .............. C09K 17/38; C05C 9/02; C05G 3/80
See application file for complete search history.

(56) References Cited

U.S. PATENT DOCUMENTS

| | | |
|---|---|---|
| 9,446,991 B2 | 9/2016 | Gabrielson et al. |
| 9,517,973 B2 | 12/2016 | Sutton |
| 2006/0093439 A1 * | 5/2006 | Smith ............... E02D 31/06 |
| | | 405/263 |

FOREIGN PATENT DOCUMENTS

| AU | 785075 | 9/2006 | |
|---|---|---|---|
| EP | 0791384 A2 * | 8/1997 | ............ C09K 17/38 |
| WO | WO 2012022164 A1 * | 2/2012 | ............ C09K 17/00 |
| WO | 2015081441 | 6/2015 | |
| WO | 20190152616 | 8/2019 | |

OTHER PUBLICATIONS

Patent Cooperation Treaty (PCT), International Search Report and Written Opinion for Application PCT/US2021/043400 filed Jul. 28, 2021, mailed Nov. 11, 2021, International Searching Authority, EP.

* cited by examiner

*Primary Examiner* — Wayne A Langel
(74) *Attorney, Agent, or Firm* — Joseph Ostroff; McDonald Hopkins LLC

(57) ABSTRACT

A soil wetting agent is shown and described herein. The soil wetting agent comprises (a) a siloxane alkoxylate; (b) a polymeric dispersant; (c) a pH adjuster; (d) a sugar; and (e) a carrier resin. The soil wetting agent can provide improved distribution of water and/or bioactive materials or nutrients to an area of soil, which can help to improve irrigation of the area as well as improved properties of the crops grown in the area in terms of germination, crop yield, crop size, etc.

19 Claims, No Drawings

SOIL WETTING COMPOSITION

CROSS-REFERENCE TO RELATED APPLICATIONS

This application claims priority to and the benefit under 35 USC 371 of International Patent Application PCT/US2021/043400 filed on Jul. 28, 2021 which claims priority to and the benefit of India Patent Registration Provisional Application No. 202021033013, filed on Jul. 31, 2020, the disclosure of which is are incorporated herein by reference in their entireties.

FIELD OF INVENTION

The present invention relates to a soil wetting composition comprising a siloxane alkoxylate. In particular, the present invention relates to a powder-based soil wetting composition comprising a siloxane alkoxylate that can improve distribution of water and/or nutrients, e.g., bioactive materials such as fertilizers, across a soil profile.

BACKGROUND

Crop nutritional compositions are often used to increase crop vigor and yield. Soil applied fertilizers or micronutrients, however, are often poorly distributed into the soil profile. Poor distribution can render these materials inefficient, which can result in localized over fertilization, run-off, or poor yields. Poor water/fertilizer distribution is typically the result of a non-uniform soil composition, where wetting characteristics can change across a soil profile. For example, some areas of the soil surface may be more hydrophobic (i.e., more difficult to wet) than other areas. These hydrophobic areas exhibit slow or no soil absorption of the water, which can lead to puddling or channeling where most of the rain or irrigation water enters the soil in one place. The result is to leave the surrounding area with poor fertilizer and moisture distribution, or it can leave areas completely untreated. The overall effect of this can be uneven availability of moisture and fertilizer for the intended crop, which can lead to poor crop vigor and lower yields.

The current practice is for the applicator to apply the fertilizer formulation (typically a powder or granule-based material) by broadcasting the formulation by hand or via a mechanical spreader. Unfortunately, poor absorption can occur because the powder is often not evenly distributed across the soil profile and/or as a result of the aforementioned issues that can be associated with irrigation or rain and the wetting characteristics of the soil being treated.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a soil wetting agent comprising a siloxane alkoxylate. In one aspect, the soil wetting agent comprises a siloxane alkoxylate, an anionic polymeric dispersant, a pH adjuster, a sugar, and a carrier resin.

The present soil wetting agent can provide enhanced water distribution across a soil profile. The soil wetting agent can also provide enhanced distribution of bioactive materials (e.g., fertilizer and other nutrients) across the soil profile. Enhancing the distribution of water and/or bioactive materials across the soil can have the benefit of increasing germination, crop yield, crop size, etc. Additionally, increasing the water distribution may allow for a reduction in the amount of water required for irrigation, which may allow for conservation of water especially in areas that may have limited supplies.

In one aspect, provided is a soil wetting agent comprising: (a) a siloxane alkoxylate; (b) a polymeric dispersant; (c) a pH adjuster; (d) a sugar; and (e) a carrier resin.

In one embodiment, the siloxane alkoxylate (a) is selected from a compound of the formula (I):

$$M^1 D^1{}_x D^2{}_y M^2 \qquad (I)$$

where:
$M^1 = (R^1)(R^2)(R^3)SiO_{0.5}$
$M^2 = (R^4)(R^5)(R^6)SiO_{0.5}$
$D^1 = (R^7)(R^8)SiO$
$D^2 = (R^9)(R^{10})SiO$
x is an integer of from about 0 to about 50;
y is an integer of from about 1 to about 15;
$R^1, R^2, R^3, R^4, R^5, R^7, R^8$, and $R^{10}$ are each independently selected from a monovalent hydrocarbon radical having from 1-4 carbon atoms;
$R^6$ is $R^{11}$ or Z, and $R^9$ is $R^{11}$ or Z, where at least one of $R^6$ or $R^9$ is Z;
$R^{11}$ is a monovalent hydrocarbon radical having from 1-4 carbon atoms;
Z is a polyalkyleneoxide group of the general formula:
—$R^{12}$—O—$[C_2H_4O]_a$—$[C_3H_6O]_b$—$[C_4H_8O]_c$—$R^{13}$,
where
$R^{12}$ is a linear or branched divalent hydrocarbon group of 3 to 4 carbon atoms, $R^{13}$ is selected from the group consisting of H or monovalent hydrocarbon radicals of from 1 to 6 carbon atoms and acetyl, a is 4 to 20, b is 0 to 30, and c is 0 to 10, with the provisos that 4≤a+b+c≤45, and a≥4; and when b+c=0, then a=5–12.

In one embodiment, the siloxane alkoxylate (a) is present in an amount of from about 5 wt. % to about 60 wt. %; the polymeric dispersant (b) is present in an amount of from about 1 wt. % to about 10 wt. %; the pH adjuster (c) is present in an amount of from about 0.1 wt. % to about 5 wt. %; the sugar component (d) is present in an amount of from about 5 wt. % to about 15 wt. %; and the resin carrier is present in an amount of from about 20 wt. % to about 50 wt. % based on the weight of the soil wetting agent composition.

In one embodiment, x is 0; y is 1-15; $R^1, R^2, R^3, R^4, R^5, R^6, R^7, R^8$, and $R^{10}$ are each independently methyl, ethyl, propyl, or butyl; $R^9$ is Z; $R^{12}$ is a divalent hydrocarbon with 3-4 carbon atoms; a is 4-15; b is 0-25; c is 0; and $R^{13}$ is hydrogen or methyl.

In one embodiment, the soil wetting agent is a powder.

In one embodiment, the polymeric dispersant is selected from an anionic polyacrylate carboxylate copolymer, an anionic styrene acrylic acid copolymer, an anionic alkylnaphthalene sulfonate condensate polymer, a sodium alkyl naphthalene sulfonate, a polyvinyl pyrrolidone copolymers, or a combination of two or more thereof.

In one embodiment, the pH adjuster is selected from a carboxylic acids, a hydroxyl acid, a phosphoric acid, or a combination of two or more thereof.

In one embodiment, the sugar is selected from lactose, maltose, maltodextrin, galactose, xylose, or a combination of two or more thereof.

In one embodiment, the carrier resin is selected from a urea formaldehyde resin.

In one embodiment, the siloxane alkoxylate (a) is present in amount of from about 5 wt. % to about 60 wt. %; the polymeric dispersant (b) is present in an amount of from about 1 wt. % to about 10 wt. %; the pH adjuster (c) is present in an amount of from about 0.1 wt. % to about 5 wt. %; the sugar (d) is present in an amount of from about 5 wt. % to about 15 wt. %; and the carrier resin (e) is present in an amount of from about 20 wt. % to about 50 wt. %, and the wt. % is based on the total weight of the soil wetting composition.

In another aspect, provided is an agrochemical composition comprising the soil wetting agent.

In one embodiment, the agrochemical composition further comprises a bioactive material.

In yet another aspect, provided is a soil composition comprising the soil wetting agent dispersed in a soil.

In still another aspect, provided is a method of enhancing water distribution to an agricultural area comprising distributing the soil wetting agent within the agricultural area. In one embodiment, the soil wetting agent is applied separately from any other materials, e.g., nutrients, bioactive materials, etc. In one embodiment, the soil wetting agent is distributed as part of an agrochemical composition comprising the soil wetting agent and a bioactive. In one embodiment, the soil wetting agent is distributed as part of a soil composition that is applied to the agricultural area being treated.

The present soil wetting agent may resolve one or more issues related to water and/or nutrient distribution in an agricultural area by providing enhanced distribution of these nutritional applications throughout the soil profile. Additionally, because of the high level of wettability of the present compositions, water applied by irrigation or rain is also more efficiently distributed throughout the soil profile leading to better utilization of water and nutritional additive by the crop. This may be observed by a variety of properties or parameters including, but not limited to, increased plant health, increased yield, visual observation of moisture distribution in the soil, etc.

Additionally, because of the high wetting efficiency of the compositions of the present invention, it is possible to reduce the amount of water required to irrigate a specific crop, thereby affording an additional benefit in water savings, which can result in lower costs to treat or cultivate an area as well as conserve natural resources.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

Provided is a soil wetting agent comprising a siloxane alkoxylate material. In one aspect, the soil wetting agent comprises (a) a siloxane alkoxylate material; (b) a polymeric dispersant; (c) a pH adjuster; (d) a sugar; and (e) a resin carrier. In one aspect, the soil wetting agent is a powder-based composition. Also provided is an agrochemical composition comprising such soil wetting agents, a soil composition comprising such soil wetting agents, and methods of treating soil and agricultural acreage using such soil wetting agents or agrochemical compositions comprising such soil-wetting agents.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, un-recited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "agrochemical" as used herein shall be understood to refer to all bioactive compounds, biological materials including extracts, fractions and by-products thereof, living organisms including microorganisms, and the like, that are suitable for agricultural use such as pesticides, herbicides, fungicides, insecticides, nematocides, larvacides, mitocides, ovacides, plant growth regulators, seed treatment agents, etc.

The term "agricultural acreage" refers to an area of land in which vegetation is to be grown. The term does not refer to nor is limited to any particular size with respect to the area of land and can encompass areas that are free-standing open areas, enclosed areas (e.g., within green houses), areas within a confined space (e.g., a pot or other type of container), etc.

The term "adjuvant" means any composition, material or substance which increases the efficacy of a bioactive material. The expressions "antidrift adjuvant" and "antidrift composition" are used synonymously herein.

The term "bioactive" refers to an agricultural chemical or material, including but not limited to, pesticides such as, but limited to, herbicides, fungicides, insecticides, acaricides, and molluscides; plant nutrients; defoliants; and plant growth regulators.

The expression "hydrocarbon group" means any hydrocarbon from which one or more hydrogen atoms has been removed, and is inclusive of alkyl, alkenyl, alkynyl, cyclic alkyl, cyclic alkenyl, cyclic alkynyl, aryl, aralkyl and arenyl groups and is inclusive of hydrocarbon groups containing at least one heteroatom.

The term "alkyl" means any monovalent, saturated straight, branched or cyclic hydrocarbon group. The term "alkenyl" means any monovalent straight, branched, or cyclic hydrocarbon group containing one or more carbon-carbon double bonds where the site of attachment of the group can be either at a carbon-carbon double bond or elsewhere therein. The term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include, but are not limited to, methyl, ethyl, propyl, isopropyl, butyl, isobutyl, tert-butyl, pentyl, hexyl, octyl, nonyl, decyl, etc. Examples of alkenyls include, but are not limited to, vinyl, propenyl, allyl, methallyl, ethylidenyl norbornane, ethylidene norbornyl, ethylidenyl norbornene and ethylidene norbornenyl. Examples of alkynyls include, but are not limited to, acetylenyl, propargyl and methylacetylenyl, The expressions "cyclic alkyl," "cyclic alkenyl," and "cyclic alkynyl" include bicyclic, tricyclic and higher cyclic structures as well as the aforementioned cyclic structures further substituted with alkyl, alkenyl, and/or alkynyl groups. Representative examples include, but are not limited to, norbornyl, norbornenyl, ethylnorbonyl, ethylnorbornenyl, cyclohexyl, ethylcyclohexyl, ethylcyclohexenyl, cyclohexylcyclohexyl and cyclododecatrienyl.

The term "superspreader" as used herein refers to the property of "superspreading" or "superwetting." Superspreading/superwetting is the ability of a drop of a solution of a superspreader material to spread to a diameter that is greater than the diameter of a drop of distilled water on a hydrophobic surface, and also greater than the diameter to which a solution of water and non-superspreading surfactant spreads on the hydrophobic surface. In addition to this difference in spread diameter, the contact angle of a drop of solution containing the superspreader material on a surface is ≤5° and therefore smaller than that of a non-superspreading material solution on the same surface.

As used herein, numerical values can be combined to form new and non-specified ranges and can be used to define either the low end point or high end point of such ranges.

The soil wetting agent comprises: (a) a siloxane alkoxylate; (b) a polymeric dispersant; (c) a pH adjuster; (d) a sugar; and (e) a carrier resin.

The siloxane alkoxylate (a) is selected from a compound of the formula (I):

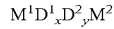  (I)

where:
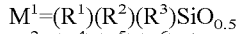
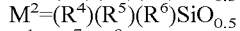
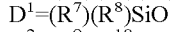
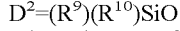
x is an integer of from about 0 to about 50;
y is an integer of from about 1 to about 15;

$R^1$, $R^2$, $R^3$, $R^4$, $R^5$, $R^7$, $R^8$, and $R^{10}$ are each independently selected from a monovalent hydrocarbon radical having from 1-4 carbon atoms;

$R^6$ is $R^{11}$ or Z, and $R^9$ is $R^{11}$ or Z, where at least one of $R^6$ or $R^9$ is Z;

$R^{11}$ is a monovalent hydrocarbon radical having from 1-4 carbon atoms;

Z is a polyalkyleneoxide group of the general formula: —$R^{12}$—O—$[C_2H_4O]_a$—$[C_3H_6O]_b$—$[C_4H_8O]_c$—$R^{13}$, where $R^{12}$ is a linear or branched divalent hydrocarbon group of 3 to 4 carbon atoms, $R^{13}$ is selected from the group consisting of H or monovalent hydrocarbon radicals of from 1 to 6 carbon atoms and acetyl, a is 4 to 20, b is 0 to 30, and c is 0 to 10, with the provisos that 4≤a+b+c≤45, and a≥4; and when b+c=0, then a=5-12.

The siloxane alkoxylate (a) can, in one or more embodiments, be provided with a combination of any of the respective variables/components:

$R^1$, $R^2$, $R^3$, $R^4$, $R^5$, $R^6$, $R^7$, $R^8$, and $R^{10}$ are each independently methyl, ethyl, propyl, or butyl;

$R^1$, $R^2$, $R^3$, $R^4$, $R^5$, $R^6$, $R^7$, $R^8$, and $R^{10}$ are each methyl; at least $R^9$ is Z;

x is an integer from 0-50, 1-50, 5-40, 10-30, or 15-25;
y is an integer from 1-15, 2-12, 3-10, 4-8, or 5-6;
a is an integer from 4-20, 4-15, 9-15, 10-15, 4-12, 5-10, 7-10, 4-6, or 7-8;
b is an integer from 0-30, 0-25, 0-20, 1-25, 1-20, 1-15, 2-10, 3-8, 4-6, or 7-10;
c is an integer from 0-10, 1-8, 2-6, or 3-5
$R^{13}$ is H or a C1-C6 alkyl.

In one embodiment, the siloxane alkoxylate is provided such that x is 0; y is 1; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon with 3-4 carbon atoms; a is 7 to 8; b and c are 0; and $R^{13}$ is hydrogen or methyl.

In one embodiment, the siloxane alkoxylate is provided such that x is 0; y is 1-15; $R^1$, $R^2$, $R^3$, $R^4$, $R^5$, $R^6$, $R^7$, $R^8$, and $R^{10}$ are each independently methyl, ethyl, propyl, or butyl, and in one embodiment methyl; $R^9$ is Z; $R^{12}$ is a divalent hydrocarbon with 3-4 carbon atoms; a is 4-15; b is 0-25 and in one embodiment 1-15; c is 0; and $R^{13}$ is hydrogen or methyl.

In another embodiment, the siloxane alkoxylate is provided such that x is 0; y is 1; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon with 3 carbon atoms; a is 4 to 6; b is 1 to 3; c is 0; and $R^{13}$ is hydrogen.

In still another embodiment, the siloxane alkoxylate is provided such that x is 0; y is 1; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon with 3 or 4 carbon atoms; a is 9 to 15; b is 1 to 5; c is 0; and $R^{13}$ is hydrogen or methyl.

In still yet another embodiment, the siloxane alkoxylate is provided such that x is 0; y is 1; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon with 4 carbon atoms; a is 9 to 15; b is 0; c is 0; $R^{13}$ is hydrogen or butyl.

In yet a further embodiment, the siloxane alkoxylate is provided such that x is 0; y is 1.9; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon with 3 or 4 carbon atoms; a is 7 to 8; b and c are 0; and $R^{13}$ is hydrogen or methyl.

In still yet a further embodiment, the siloxane alkoxylate is provided such that x is 15 to 18; y is 5 to 7; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon having 3 or 4 carbon atoms; a is 7 to 8; b and c are 0; and $R^{13}$ is hydrogen or methyl.

In another embodiment, the siloxane alkoxylate is provided such that x is 20 to 25; y is 3 to 6; $R^1$, $R^2$, $R^3$, $R^4$, $R^5$, $R^6$, $R^7$, $R^8$, and $R^{10}$ are methyl; $R^9$ is Z; $R^{12}$ is a divalent hydrocarbon having 3 or 4 carbon atoms; a is 7 to 10; b is 7 to 10; subscript c is 0; and $R^{13}$ is hydrogen or methyl.

In still another embodiment, the siloxane alkoxylate is provided such that x is 38 to 45; y is 4 to 12; $R^1$, $R^2$, $R^3$, $R^4$, $R^5$, $R^6$, $R^7$, $R^8$ and $R^{10}$ are methyl; $R^9$ is Z; $R^{12}$ is a divalent hydrocarbon having 3 or 4 carbon atoms; a is 10 to 15; subscript b is 22 to 28; c is 0; $R^{13}$ is hydrogen or methyl.

The soil wetting agent includes a polymeric dispersant (b). In one embodiment, the polymeric dispersant can be selected from a dispersant selected from anionic polyacrylate carboxylate copolymers, anionic styrene acrylic acid copolymers, anionic alkylnaphthalene sulfonate condensate polymers, sodium alkyl naphthalene sulfonate, polyvinyl pyrrolidone copolymers, or a combination of two or more thereof.

"Anionic polyacrylate carboxylate copolymers" refer to a group of polymers based on acrylate monomers with a vinyl group and a carboxylic acid terminus neutralized as a sodium salt. Examples of suitable anionic copolymer dispersants include, but are not limited to, Agrilan® 789 dispersant (an hydrophobically modified copolymer available from AkzoNobel Agrochemicals, Agrilan is a registered trademark of Akzo Nobel Chemicals International), Agrilan® 700 dispersant (also available from AkzoNobel Agrochemicals), and Sokalan® acrylic polymers (available from BASF, Sokolan is a registered trademark of BASF Aktiengesellschaft).

"Anionic styrene acrylic acid copolymers" refer to a group of sodium neutralized styrene acrylic acid copolymers. Examples of suitable anionic copolymer dispersants include, but are not limited to, Tersperse® 2700 (which is a styrene methacrylic acid STYMA based disperant available from Huntsman Corporation, Tersperse is a registered trademark of Huntsman Petrochemical Corporation) and Atlox Metasperse™ 550 S (available from CRODA).

"Polyvinyl pyrrolidone copolymers" refer to linear, non-ionic polymers which have good solubility in many organic solvents and water. Examples of suitable polyvinyl pyrrolidone copolymers include, but are not limited to, EasySperse™ P-20 spray-dried, optimized composite polyvinyl pyrrolidone and methyl vinyl ether/maleic acid half ester dispersant (available from Ashland), Agrimer® polymers (available from Ashland, Agrimer is a registered trademark of ISP Investments Inc.) and Luvitec™ polymers (available from BASF).

The alkyl naphthalene sulfonates may have alkyl groups with 1-10 carbon atoms, such as methyl, isopropyl, n-butyl, sec-butyl, and nonyl. Suitable alkyl naphthalene sulfonates include, but are not limited to, sodium alkyl naphthanlene sulfonates. Some examples include, but are not limited to, sodium butyl naphthalene sulfonate and sodium nonyl naphthalene sulfonate. Examples of commercial alkyl naphthalene sulfonates are Morwet® B and Morwet IP.

Examples of suitable polymeric dispersants include, but are not limited to, Petro AA, Agrilan® 789, Agrilan® 788, Morwet® D-425, and Morwet® EFW.

A pH adjusting agent (c) may be included in the composition. The pH adjusting agent can, in one embodiment, be an acidification agent that is utilized to control the pH such that the pH is below 5. Reducing the pH to between pH 4 and 5 can aid with herbicide uptake and address water hardness issues. Suitable pH adjusting agents include carboxylic acids, including the hydroxyl acids, and phosphoric acid. Some specific examples of suitable pH adjusting agents include, but are not limited to, propionic acid, dimethylolpropionic acid, acetic acid, lactic acid, citric acid, ascorbic acid, butyric acid, glycolic acid, valeric acid, cyclopentane carboxylic acid, 2-methyl pentanoic acid, and the like.

The soil wetting agent includes one or more sugars (d). The sugar can be selected from any sugar as desirable for a particular purpose or intended application. In one embodiment, the sugar can be selected from lactose, maltose, maltodextrin, galactose, xylose, or a combination of two or more thereof.

The soil wetting agent includes a resin carrier (e) selected from a urea-formaldehyde resin. The urea-formaldehyde resin is not particularly limited and can be selected as desired for a particular purpose or intended application. In one embodiment, the urea-formaldehyde resin may be a polymethyl urea resin with approximately 0.6% reactive methylol groups. In one embodiment, the urea-formaldehyde resin may have primary particles of 0.1 to 0.15 micrometers, forming agglomerates of 3.5 to 6.5 micrometers diameter on average. An exemplary urea-formaldehyde resin is PERGOPAK M® 2, a trademark of Albemarle Corporation, which contains from about 10 to 15% water. In another embodiment, the urea-formaldehyde is the unrefined precursor to PERGOPAK M® 2, sometimes referred to as "the filter cake", and contains from about 40 to 80% water.

The siloxane alkoxylate (a) may be present in an amount of from about 5 wt. % to about 60 wt. %; from about 10 wt. % to about 50 wt. %; from about 15 wt. % to about 40 wt. %; or from about 20 wt. % to about 30 wt. % based on the total weight of components (a)-(e). In one embodiment, the siloxane alkoxylate (a) is present in an amount of from about 20 wt. % to about 60 wt. % based on the total weight of the soil wetting agent composition.

The polymeric dispersant (b) may be present in an amount of from about 1 wt. % to about 10 wt. %; from about 2 wt. % to about 7 wt. %; of from about 3 wt. % to about 5 wt. % based on the weight of the soil wetting agent composition.

The pH adjuster (c) may be present in an amount of from about 0.1 wt. % to about 5 wt. %; from about 0.5 wt. % to about 3 wt. %; or from about 1 wt. % to about 2 wt. % based on the weight of the soil wetting agent composition.

The sugar component (d) may be present in an amount of from about 5 wt. % to about 15 wt. %; from about 7 wt. % to about 12 wt. %; or from about 8 wt. % to about 10 wt. %.

The resin carrier is present in an amount of from about 20 wt. % to about 50 wt. %; from about 25 wt. % to about 45 wt. %; or from about 30 wt. % to about 40 wt. % based on the weight of the soil wetting agent composition.

The weight percent of the respective components of the soil wetting composition are based on the total weight of components of the soil wetting composition. Additionally, it will be appreciated that even though the endpoints of the respective ranges may total more or less than 100, one skilled in the art will understand that the percentage of the components will add up to 100 in providing the soil wetting composition.

The soil wetting agent can be provided in any suitable form as desired for a particular purpose. In one embodiment, the soil wetting agent is provided as a powder-based composition. The soil wetting agent can be prepared, in one embodiment, by blending the respective components and mixing to form a dry mixture. In one embodiment, a powder-based soil wetting composition is prepared by combining the resin carrier (e), polymeric dispersant (b), and pH adjuster (c) and mixing to form a homogenous dry mixture (A). The siloxane alkoxylate (a) is then applied to the mixture (A). The siloxane alkoxylate can be applied by any suitable method. In one embodiment, the siloxane alkoxylate is applied by spraying. Spraying can be accomplished by multiple applications of the siloxane alkoxylate. The mixture with the siloxane alkoxylate is then homogenized until evenly mixed. The sugar (d) is then added to the powder mixture, and the mixture is mixed to form a homogenous powder.

The soil wetting agent can be employed to treat an agricultural area to provide improved water and/or nutrient distribution to the area. The soil wetting agent can be separately applied to an area or can be provided as part of a composition with other materials (e.g., nutrients, bioactive materials, etc.), or as part of a soil composition.

In one embodiment, the soil wetting agent is provided as part of an agrochemical composition to be distributed to an agricultural area. The soil wetting agent of the present invention may be combined with any of a variety of agrochemicals including, without limitation, pesticides, fertilizers and micronutrients, and the like, in accordance with procedures well known in the art and in amounts sufficient to improve, increase or enhance the delivery, availability and/or efficacy of their bioactive component(s).

The term "pesticide" herein means any compound used to destroy pests, e.g., rodenticides, insecticides, miticides, fungicides, herbicides, and the like. Typical uses for pesticides include agricultural, horticultural, turf, ornamental, home and garden, veterinary and forestry applications. The pesticidal formulations of the present invention also include al least one pesticide. Optionally, the pesticidal formulation may include excipients, cosurfactants, solvents, foam control agents, deposition aids, drift retardants, biologicals, micronutrients, fertilizers, and the like. Illustrative examples of pesticides that can be employed include, but are not limited to mitotic disrupters, lipid biosynthesis inhibitors, cell wall inhibitors, and cell membrane disrupters. The amount of pesticide employed in agrochemical formulations may vary with the type of pesticide employed. More specific examples of pesticide compounds that can be used with the formulations include, but are not limited to, herbicides and growth regulators such as phenoxy acetic acids, phenoxy propionic acids, phenoxy butyric acids, benzoic acids, triazines and s-triazines, substituted ureas, uracils, bentazon, desmedipham, methazole, phenmedipham, pyridate, amitrole, clomazone, fluridone, norflurazone, dinitroanilines, isopropalin, oryzalin, pendimethalin, prodiamine, trifluralin, glyphosate, sulfonylureas, imidazolinones, dethodim, diclofop-methyl, fenoxaprop-ethyl, fluazifop-p-butyl, haloxyfop-methyl, quizalofop, sethoxydim, dichlobenil, isoxaben, and bipyridylium compounds.

Fungicide compositions that can be used with the present invention include, but are not limited to, aldimorph, tridemorph, dodemorph, dimethomorph; flusilazol, azaconazole, cyproconazole, epoxiconazole, furconazole, propiconazole, tebuconazole and the like; imazalil, thiophanate, benomyl carbendazim, chlorothialonil; dieloran, trifloxystrobin, fluoxystrobin, dimoxystrobin, azoxystrobin, furcaranil, prochloraz, flusulfamide, famoxadone, captan, maneb, mancozeb, dodicin, dodine, and metalaxyl.

Insecticides, including larvacide, miticide and ovacide compounds that can be used with the composition of the present invention include, but are not limited to, *Bacillus thuringiensis*, spinosad, abamectin, doramectin, lepimectin, pyrethrins, carbaryl, primicarb, aldicarb, methomyl, amitraz, boric acid, chlordimeform, novaluron, bistrifluron, triflumuron, diflubenzuron, imidacloprid, diazinon, acephate, endosulfan, kelevan, dimethoate, azinphos-ethyl, azinphos-methyl, izoxathion, chlorpyrifos, clofentezine, lambda-cyhalothrin, permethrin, bifenthrin, cypermethrin, and the like.

Fertilizers, and micronutrients include, but are not limited to, zinc sulfate, ferrous sulfate, ammonium sulfate, urea, urea ammonium nitrogen, ammonium thiosulfate, potassium sulfate, monoammonium phosphate, urea phosphate, calcium nitrate, boric acid, potassium and sodium salts of boric acid, phosphoric acid, magnesium hydroxide, manganese carbonate, calcium polysulfide, copper sulfate, manganese sulfate, iron sulfate, calcium sulfate, sodium molybdate, calcium chloride, or a combination of two or more thereof.

The respective components of the argochemical composition comprising the present soil wetting agents are preferably provided as part of a dry blend mixed with the soil wetting composition.

In one embodiment, the powder based soil wetting composition is mixed with at least a fertilizer to provide a homogenous mixture of the powder based soil wetting composition and the fertilizer, which can then be distributed over a given area of land. The amount of powder based soil wetting agent that is utilized with the fertilizer can be selected as desired for a particular purpose or intended application. In one embodiment, the powder based soil wetting composition is provided in an amount of about 5 g/kg of fertilizer, about 10 g/kg of fertilizer, about 15 g/kg of fertilizer, or about 20 g/kg of fertilizer.

In still another embodiment, the present invention provides a soil composition comprising the powder based soil wetting agent. The soil composition can be a free standing natural area of soil (e.g., free standing agricultural area) to which the soil wetting composition is added. Alternatively, the soil composition can be a pre-mixed soil composition containing the soil wetting agent and a soil material. The pre-mixed soil composition containing the soil wetting agent can be subsequently distributed over desired areas of an agricultural area to be treated. The amount or concentration of soil wetting composition in the soil is not particularly limited and can be selected as desired to provide a desired amount/concentration of soil wetting composition within an area to be treated.

The soil wetting agent can be applied to an area or plot of land (e.g., agricultural acreage). The use of the present powder based soil wetting compositions can be employed to improve the moisture content of an area. This can be to increase the overall distribution of water in the area being treated. Additionally, the use of the soil wetting agent can also allow for the use of a lower quantity of water can be applied to the area being treated but still provide sufficient hydration to the area. In one embodiment, the use of the present powder based soil wetting compositions allows for employing 5% less water, 10% less water, 15% less water, 20% less water, 25% less water 30% less water, 40% less water, 50% less water, 60% less water, even up to 70% less water to treat a plot of land as compared to the amount of water required to treat the same area absent the present powder based soil wetting composition. In one embodiment, the use of the soil wetting agent allows for employing 5% to 70% less water, 10% to 65% less water, 15% to 60% less water, 20% to 55% less water, or 25% to 50% less water to treat a plot of land as compared to the amount of water required to treat the same area absent the present powder based soil wetting composition.

The present powder based soil wetting compositions can also have the benefit of improving the efficacy of micronutrients and bioactive materials such as fertilizers. The improvement in efficacy of a fertilizer, nutrient, etc., may be evidenced by a variety of features or characteristics associated with the growth of a given plant including, but not limited to, germination rate, length, number of leaves, size of bulb, size of fruit body, etc.

The use of the present soil wetting agents is not limited to use with a particular type of soil or with respect to the types of crops or vegetation to be grown within the area of land to be treated with the soil wetting agent.

To treat a plot of land with the powder based soil wetting composition, the powder based soil wetting composition can be distributed within a given area of the plot of land as desired. The powder based soil wetting composition can be distributed separately from other materials being distributed in the area to be treated or it can be distributed as a mixture with one or more other materials that are to be disposed within the area being treated. The powder based soil wetting composition (whether alone or as part of a mixture of other materials) can be distributed within a given area by any suitable method or means of distributing such materials including, but not limited to, broadcasting by hand or by a mechanical broadcasting mechanism such as a spreader.

The present soil wetting compositions, agrochemical compositions comprising such soil wetting compositions, methods of using such compositions, etc., can be employed to treat areas where a variety of crops, plants, etc., may be grown. Examples of suitable crop plants whose production and growth may be enhanced by the presence of the present soil wetting compositions, alone or in conjunction with fertilizers, nutrients, etc., include, but are not limited to, cereals, for example wheat, rye, barley, triticale, oats, rice, etc.; beet, for example sugar, fodder beet, etc.; pome fruit, stone fruit, and soft fruit, for example apples, pears, plums, peaches, almonds, cherries, strawberries, raspberries, currants, goose-berries, etc.; legumes, for example beans, lentils, peas, lucerne, soybeans, etc.; oil crops, for example oilseed rape, mustard, olives, sunflowers, coconut, cacao, castor beans, oil palm, peanuts, soybeans, etc.; cucurbits, for example pumpkins/squash, cucumbers, melons, etc.; fiber crops, for example cotton, flax, hemp, jute, etc.; citrus fruit, for example oranges, lemons, grapefruit, tangerines, etc.; vegetable plants, for example spinach, lettuce, asparagus, cabbages, carrots, onions, tomatoes, eggplant, potatoes, pumpkin/squash, radish, capsicums, etc.; plants of the laurel family, for example avocados, cinnamon, camphor, etc.; plants of the ginger family, for example, ginger, turmeric, cardamom, galangal, etc.; energy crops and industrial feedstock crops, for example maize, soybeans, wheat, oilseed rape, sugar cane, oil palm, etc.; maize; tobacco; nuts; coffee; tea; bananas; wine (dessert grapes and grapes for vinification); hops; grass, for example turf; sweetleaf (*Stevia rebaudania*); rubber plants, and forest plants, for example flowers, shrubs, deciduous trees, and coniferous trees, and propagation material, for example seeds, and harvested produce of these plants.

Aspects and embodiments of the present invention may be further understood in light of the following examples. The examples are not intended to limit the scope of the invention but to show representative examples and exemplary embodiments of the powder based soil wetting composition and examples of the use of such compositions to treat agricultural areas and promote vegetation growth.

EXAMPLES

Example 1

The siloxane alkoxylates employed in the examples are of the formula:

$$M^1 D^1_x D^2_y M^2$$

where:

$M^1 = (R^1)(R^2)(R^3)SiO_{0.5}$ $M^2 = (R^4)(R^5)(R^6)SiO_{0.5}$ $D^1 = (R^7)(R^8)SiO$ $D^2 = (R^9)(R^{10})SiO$ $R^1$, $R^2$, $R^3$, $R^4$, $R^5$, $R^6$, $R^7$, $R^8$, and $R^{10}$ are each methyl, and $R^9$ is Z where Z is $-CH_2CH_2CH_2-O-(C_2H_4O)_a(C_3H_6O)_b(C_4H_8O)_c R^{13}$. Table 1 provides a description of the variables for the respective groups of the siloxane alkoxylate and for the $R^{13}$ group.

TABLE 1

Description of the Siloxane Alkoxylate Components

| ID | x | y | a | b | c | $R^{13}$ |
|---|---|---|---|---|---|---|
| SA-1 | 0 | 1 | 5 | 2.5 | 0 | H |
| SA-2 |  | 1 | 8 | 0 | 0 | H |
| SA-3 | 0 | 1 | 8 | 0 | 0 | $CH_3$ |
| SA-4 | 0 | 1 | 12 | 0 | 0 | H |
| SA-5 | 0 | 1 | 12 | 3 | 0 | H |
| SA-6 | 0 | 1 | 4.5 | 5.1 | 0 | H |
| SA-7 | 0 | 1.9 | 8 | 0 | 0 | $CH_3$ |
| SA-8 | 15 | 6 | 8 | 0 | 0 | H |
| SA-9 | 40 | 6 | 10 | 25 | 0 | H |

Example 2

The composition of the present invention was prepared by combining the urea formaldehyde resin, citric acid, and Agrilan 789 in a mixer and agitating until a homogenous dry mixture is achieved.

To this dry mixture the trisiloxane alkoxylate component of the present invention is slowly spray applied onto the premix in three separate aliquots (15 kg+15 kg+20 kg) and homogenize until evenly mixed. Next the Supertab 21 AN was added into the powder mixture using a Ribbon blender with chopper to get homogenous powder.

Table 2 provides the formulation of the powder-based soil wetting composition of the present invention. The product is a Powder Wetting Agent (ID: PWA-1).

TABLE 2

Formulation of the Powder-based soil wetting composition (ID: PWA-1)

| Components | Supplier | Wt % | Description |
|---|---|---|---|
| SA-1 | Momentive | 50.0 | Trisiloxane Super spreader |
| Agrilan 789 | Nouryon | 5.0 | Hydrophobically modified polyacrylate |
| Citric Acid | Merck | 0.5 | pH adjuster |
| Supertab 21 AN | DFE Pharma | 9.5 | Lactose anhydrous |
| Pergopak M | Huber | 35.0 | Urea formaldehyde resin |
| Total |  | 100.0 |  |

Tables 3A and 3B provide the properties of two batches (A and B) of the Powder-based soil wetting composition of the present invention (PWA-1).

TABLE 3A

Physical Properties of the Powder-based soil wetting composition (PWA-1A)

| Physical Property | Expected Value | Type |
|---|---|---|
| Appearance | White Free-flowing homogenous powder | Yes |
| Spreading Diameter (0.2%) | 30-50 mm | 48 mm |
| pH (1%) | 5~8 | 7.9 |
| Moisture content | Max 5.0% | 7.0 |
| Granulometry # 325 (45μ) | Mini 98.0% | Passing |
| Bulk Density (20) | 0.20-0.30 g/ml | 0.28 |
| Bulk Density (0) | 0.15-0.20 g/ml | 0.23 |

TABLE 3B

Physical Properties of the Powder-based soil wetting composition (PWA-1B)

| Physical Property | Expected Value | Type |
|---|---|---|
| Appearance | White Free-flowing homogenous powder | Yes |
| Spreading Diameter (0.2%) | 30-50 mm | 50 mm |
| pH (1%) | 5~8 | 7.2 |
| Moisture content | Max 5.0% | 6.9 |
| Granulometry # 325 (45μ) | Mini 98.0% | Passing |
| Bulk Density (20) | 0.20-0.30 g/ml | 0.235 |
| Bulk Density (0) | 0.15-0.20 g/ml | 0.28 |

Example 3

The impact of Formulation 1, a composition of the present invention on fertilizer efficacy, on onion yield, was determined in a field trial. Trial plots of 528 square meters were treated with NPK (nitrogen/phosphorus/potassium) fertilizer (10:26:26) at 18 kg/plot, either alone or in combination with Formulation 1, at various dose rates (5 g, 10 g, 15 g or 20 g per Kg of fertilizer).

The fertilizer and appropriate doses of PWA-1 were measured out on a plastic sheet and dry blended by hand until a homogeneous mixture was achieved. The dry mix was then broadcast by hand over the plot, making sure the mixture was surrounding the area above the root zone of the crop.

A minimum of two applications were made: The first at 30 days after the seedlings were transplanted, and the second at 60 days after transplanting.

After each application the treatments were watered into the soil via irrigation, with 15675 L water per plot. Water was applied at a rate of 5.5 L/second over a 47.5 minute period, equivalent to approximately 118,800 L/acre.

Table 4 illustrates that the composition of the present invention enhanced fertilizer performance, thereby increasing the overall length of onion leaves, the average number of leaves and onion bulb-size, relative to the fertilizer formulation without PWA-1.

TABLE 4

The Impact of Adjuvant and Fertilizer on Onion viability and size

| Treatment | PWA-1 (g/Kg Fertilizer) | PWA-1 (g/Plot) | Length (cm) | No. of Leaves | Bulb Size (cm) | Bulb size % Increase Vs. Control |
|---|---|---|---|---|---|---|
| T1 | 5 | 90 | 63.9 | 7.8 | 7.6 | 32.9 |
| T2 | 10 | 180 | 64.0 | 7.8 | 8.7 | 41.4 |
| T3 | 15 | 270 | 64.0 | 7.4 | 9.0 | 43.3 |
| T4 | 20 | 360 | 61.6 | 7.6 | 8.7 | 41.7 |
| T5* | 0 | 0 | 59.4 | 6.6 | 5.1 | NA |

*Control: Fertilizer Mix alone

Example 4—Impact of PWA-1 on Germination of Ground-Nut

This example demonstrates that the composition of the present invention facilitates a reduction in the irrigation water required for a given crop. Therefore, plots (600 m$^2$) were sown with Peanut (*Arachis hypogaea*) and two days after sowing, the fields were irrigated with water at a rate equivalent to 100,000 L/acre.

One plot was used as the standard treatment (Water alone) and to a second plot, the composition of the present invention, PWA-1 was applied as an irrigation aid. Therefore, 150 g PWA-1 was premixed by hand into 10 kg soil. Then the soil containing the PWA-1 was broadcast by hand to evenly distribute the mixture over the test plot.

The plots were assessed for the number of plant that germinated for each treatment. Therefore, at 15 days after sowing, five randomly selected sectors (15×20 cm) in each plot were evaluated for total number of peanut plants present.

Table 5 demonstrates that the addition of PWA-1 improves the overall germination rate of ground nut, thereby giving a higher number of peanut plants germinated in the plot containing the PWA-1 treatment relative to the water only plot.

TABLE 5

Germination of Ground Nut (with and without adjuvant)

| Run | Untreated Plot | Treated with PWA-1 |
|---|---|---|
| 1 | 1 | 3 |
| 2 | 2 | 2 |
| 3 | 0 | 3 |
| 4 | 1 | 3 |
| 5 | 1 | 4 |
| Total | 5 | 15 |
| Average | 1 | 3 |

Example 5: Effect of Adjuvant and Fertilizer on Soil Moisture Level and Peanut Yield The effect of adjuvant on the peanut productivity is demonstrated in this example, where NPK fertilizer treatments (20:20:0) were applied at an equivalent rate of 150 Kg/acre, with and without PWA-1, a composition of the present invention, at equivalent rates between 0.75 and 3 Kg/acre. Two applications were made for each treatment. The first treatment was applied at time of sowing. The second treatment of fertilizer was applied 60 days after sowing.

The fertilizer treatments without the adjuvant are the current commercial standard application and are used herein as a benchmark. Treatments were scaled down to 135 square meter (0.0334 acres) plots and results are reported in yield/acre equivalents.

The NPK fertilizer was poured out on a on plastic matt and the PWA-1 composition was added on top at the desired use rate (5, 10, 15 or 20 g/Kg fertilizer). The fertilizer and PWA-1 were then mixed thoroughly together by hand. The mixture was broadcast by hand throughout the peanut crop, directed at or near to the base of the peanut plants.

The plots were irrigated at a rate of 2500 L/plot (equivalent to 74,974 L/ac), and moisture measurement were done at 7 days after treatment. Moisture measurements were made using a moisture sensing probe from "The EMPL Company", India.

Peanut yields were determined at the time of harvesting 140-150 days after sowing, where the number of pods, weight of pods, number of nuts and weight of nuts was assessed for five (5) randomly selected plants (4 corner and 1 center).

Table 6 demonstrates that the treatments (TMT Nos: T2, T3, T4 and T5) containing the composition of the present invention (PWA-1) significantly increased peanut yield at all levels, relative to the standard treatment (TMT T1).

Treatments containing the composition of the present invention (PWA-1) gave an increase in the number of pods, weight of pods, number of nuts, and weight of nuts. Additionally, Treatments T2-T5 gave between a 2× and 4× increase in relative peanut yield (as evidenced by the increase from the 1267 Kg/ac yield for the control up to the 5380 Kg/ac yield for Treatment T5).

Another important aspect of the results for treatments containing PWA-1 is the moisture availability and retention relative to the standard treatment. Moisture readings decrease numerically as a moisture level increases. For example:
 0-10 Centibars=Saturated soil (Do not irrigate)
 10-30 Centibars=Soil is adequately wet (except coarse sands, which are drying)
 30-60 Centibars=Usual range for irrigation (most soils) (Needs irrigation)
Recommendations from: "The Irrometer Company", Riverside, California; https://www.irrormeter.com/basics.html The treatments containing PWA-1 gave a lower tensiometer value for moisture indicating that more moisture was retained 7 days after treatment than the standard application of Treatment T1 (Table 6, see column for "Soil Tensiometer reading (Centibars)").

Example 6: Retention of Root Mass in Rice Transplants

This example evaluates the impact of treating rice seedlings with the composition of the present invention, and particularly on the impact the present compositions may have with respect to plucking efficiency. Improvement on plucking efficiency is evaluated as an improvement in the percentage of rice seedlings that maintain their root-mass after being plucked for transplanting.

Treatments were prepared by placing 5 kg of sand on a plastic matt and adding the desired amount of either PWA-1 or SA-2. The components were then mixed by hand to ensure homogeneous distribution of the adjuvant in the sand. The mixture was then broadcast by hand throughout the plot (100 Square meters). Plots were irrigated with approximately 1,800 L water (which is equivalent to about 180000 L/ha).

Nursery grown rice seedlings (28 days old) were treated with either the composition of the present invention (PWA-1) or a comparative trisiloxane alkoxylate (SA-2) 24 hours prior to plucking. These were also compared to the typical untreated application. Note the SA-2 comparative trisiloxane alkoxylate was dosed at a rate equivalent to the SA component in the PWA-1.

Table 7 demonstrates that treatments with adjuvant provided better seedling removal (more intact roots) than the typical application (water only). Also, the number of seedlings with intact roots increased with adjuvant dose rate. Additionally, the composition of the present invention significantly improved the number of viable rice seedling transplants (observed as the percentage of plants with intact roots) relative to the liquid SA-2 trisiloxane alkoxylate and the Control (i.e., T7 with no adjuvant), which received only the irrigation water. Therefore, this demonstrates that the composition of the present invention significantly improved seedling viability thereby reducing loss (up to 30% loss in typical treatment).

Another important result to note is that although the dose rate of the SA component for PWA-1 and SA-2 is essentially the equivalent in all treatment, the applications containing the dry powder formulation of PWA-1 provided an unexpected increase in the number (and percentage) of viable seedlings recovered by plucking.

TABLE 6

Effect of Adjuvant and Fertilizer on Soil Moisture Level and Peanut Yield

| TMT No. | Treatment (TMT) | Dose/Acre (Kg) | Soil Tensiometer reading (Centibars) | On 5 Randomly (4 Corner & 1 Centre) Selected plants | | | | Pod Yield/Acre (Kg) |
|---|---|---|---|---|---|---|---|---|
| | | | | No. of Pods | Weight of Pods (Gm) | No. of Nuts | Weight of Nuts | |
| T1 (Control) | N:P:K— 20:20:00 | 150 | 22 | 61 | 90.5 | 121 | 50.5 | 1267 |
| T2 | N:P:K— 20:20:00 + Silwet Power | 150 + 0.75 | 18 | 107 | 209.5 | 207 | 115.5 | 2933 |
| T3 | N:P:K— 20:20:00 + Silwet Power | 150 + 1.5 | 13 | 107 | 215.3 | 208 | 117 | 3014 |
| T4 | N:P:K— 20:20:00 + Silwet Power | 150 + 2.25 | 12 | 162 | 357.2 | 286 | 135 | 5000 |
| T5 | N:P:K— 20:20:00 + Silwet Power | 150 + 3 | 9 | 205 | 384.3 | 316 | 176.4 | 5380 |

TABLE 7

Effect of Adjuvant on Root-mass Retention in Rice Seedling Transplants

| Treatment No. | Adjuvant | Dose (g/100 m2) | No. Plants with Roots | No. Plants without Roots | % loss |
|---|---|---|---|---|---|
| T1 | PWA-1 | 25 g | 9 | 1 | 10 |
| T2 | PWA-1 | 50 g | 10 | 0 | 0 |
| T3 | PWA-1 | 75 g | 10 | 0 | 0 |
| T4 | SA-2 | 12.5 mL | 8 | 2 | 20 |
| T5 | SA-2 | 25 mL | 9 | 1 | 10 |
| T6 | SA-2 | 37.5 ml | 10 | 0 | 0 |
| T7 | None | None | 7 | 3 | 30 |

Example 7 Improved Moisture Retention (Prophetic Example)

More efficient moisture retention may indicate that less water may be required for irrigation (up to as much as 60-70% less water). Because of the hydrophobic nature of some soils, water is not always evenly distributed in the soil profile, thereby spots can occur where channeling (water absorbing in one spot, leaving surrounding area deficient) occurs or water may run-off to a lower point in the field (pooling) or to the field edges, where it is not available to the crop. By having the correct amount of the composition of the present invention applied alone, or with fertilizer can increase water absorption giving a more even distribution in the soil profile, thereby minimizing run-off or pooling or channeling.

Example 8—Water-Holding Capacity

The water holding capacity of soil is a key factor in irrigation, and for seed germination and sustainability of a crop. Soils can become hydrophobic because of a number of reasons. For example, decayed organic matter at the surface, or natural hydrophobic films secreted by microbial organisms can make the soil surface repel water. Additionally, mineral content of the soil can contribute to water repellency.

This example demonstrates that the compositions of the present invention promote wetting of hydrophobic soils and thereby increase the water holding capacity, which is critical for plant vitality.

Formulations of the "Powder Wetting Agent" compositions in accordance with aspects and embodiments of the present invention were prepared according to the method and composition outlined in Example 2, Table 3. The only difference in composition was several of the Siloxane Alkoxylate (SA) components were substituted for SA-1 as illustrative examples of the different types of SA components useful in the present invention.

Table 8 provides the SA component used in each of the following compositions of the Powder Wetting Agent formulations.

TABLE 8

SA Component used in the PWA formulations

| Siloxane Alkoxylate | Formulation ID |
|---|---|
| SA-1 | PWA-1 |
| SA-2 | PWA-2 |
| SA-5 | PWA-3 |
| SA-8 | PWA-4 |
| SA-3 | PWA-5 |

Water-holding capacity test:

Samples of soil (Miracle-Gro, Seed Starting Potting Mix) were mixed with the different PWA compositions as follows. 1.0 g of the PWA formulation was mixed into 65.0 g of potting soil (equivalent to 15 g PWA/kg soil), using an overhead paddle stirrer and mixed until homogeneous (about 5 min.). The 10 g of soil mixture was carefully weighed out onto a sheet of aluminum foil (~8×8") as a compact pile. Using an inverted 10 dram vial, a depression (well) in the middle of the pile is made about 1 cm deep. The samples were then titrated with water (using a burette). The water was added dropwise at a rate of about 3 drops/second into soil. The endpoint was reached when the water runs off or breaks through the sides to the foil surface, which indicates saturation. The volume (mL) of water delivered to the endpoint was recorded in Table 9. The higher the volume required to reach the endpoint, the greater the water-holding capacity.

Table 9 demonstrates the water-holding capacity of soil containing the compositions of the present invention as compared to hydrophobic soil (Comparative). Soil mixtures containing the PWA compositions of the present invention significantly increased the water-holding capacity of the soil, by over 6.5× that of water alone (≥31 mL for the PWA components vs 4.7 mL for soil alone).

TABLE 9

The effect of PWA component on the "Water-holding" capacity of soil

| Soil Wetter | Water Absorbed (mL) | Stdev |
|---|---|---|
| PWA-1 | 31.3 | 1.2 |
| PWA-2 | 31.7 | 3.1 |
| PWA-3 | 31.7 | 5.1 |
| PWA-4 | 32.7 | 2.5 |
| PWA-5 | 31.3 | 2.5 |
| Soil Alone | 4.7 | 1.5 |

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a soil wetting composition including a powder-based soil wetting composition, an agrochemical composition comprising such soil wetting compositions, soil compositions comprising such soil wetting compositions, and methods of treating agricultural areas including crops, plants, etc. with such soil wetting agents. Modifications may occur to those skilled in the art and to those who may make and use the invention. The disclosed embodiments are merely for illustrative purposes and not intended to limit the scope of the invention or the subject matter set forth in the claims.

What is claimed is:

1. A soil wetting agent comprising: (a) a siloxane alkoxylate; (b) a polymeric dispersant; (c) a pH adjuster; (d) a sugar; and (e) a carrier resin.

2. The soil wetting agent of claim 1, wherein the siloxane alkoxylate (a) is selected from a compound of the formula (I):

$$M^1 D^1_x D^2_y M^2 \quad (I)$$

where:
$M^1 = (R^1)(R^2)(R^3)SiO_{0.5}$
$M^2 = (R^4)(R^5)(R^6)SiO_{0.5}$
$D^1 = (R^7)(R^8)SiO$
$D^2 = (R^9)(R^{10})SiO$
x is an integer of from about 0 to about 50;
y is an integer of from about 1 to about 15;
$R^1, R^2, R^3, R^4, R^5, R^7, R^8$, and $R^{10}$ are each independently selected from a monovalent hydrocarbon radical having from 1-4 carbon atoms;
$R^6$ is $R^{11}$ or Z, and $R^9$ is $R^{11}$ or Z, where at least one of $R^6$ or $R^9$ is Z;
$R^{11}$ is a monovalent hydrocarbon radical having from 1-4 carbon atoms;
Z is a polyalkyleneoxide group of the general formula:

$$R^{12}\text{—O—}[C_2H_4O\pi_a\text{—}[C_3H_6O\pi_b\text{—}[C_4H_8O\pi_c\text{—}R^{13},$$
where $R^{12}$ is a linear or branched divalent hydrocarbon group of 3 to 4 carbon atoms, $R^{13}$ is selected from the group consisting of H or monovalent hydrocarbon radicals of from 1 to 6 carbon atoms and acetyl, a is 2 to 20, b is 0 to 30, and c is 0 to 10, with the provisos that $4 \leq a+b+c \leq 45$, and $a \geq 4$; and when b+c=0, then a=5-12.

3. The soil wetting agent of claim 1, wherein the siloxane alkoxylate (a) is present in an amount of from about 5 wt. % to about 60 wt. %; the polymeric dispersant (b) is present in an amount of from about 1 wt. % to about 10 wt. %; the pH adjuster (c) is present in an amount of from about 0.1 wt. % to about 5 wt. %; the sugar component (d) is present in an amount of from about 5 wt. % to about 15 wt. %; and the resin carrier is present in an amount of from about 20 wt. % to about 50 wt. % based on the weight of the soil wetting agent composition.

4. The soil wetting agent of claim 1, wherein x is 0; y is 1-15; $R^1, R^2, R^3, R^4, R^5, R^6, R^7, R^8$, and $R^{10}$ are each independently methyl, ethyl, propyl, or butyl; $R^9$ is Z; $R^{12}$ is a divalent hydrocarbon with 3-4 carbon atoms; a is 4-15; b is 0-25; c is 0; and $R^{13}$ is hydrogen or methyl.

5. The soil wetting agent of claim 1, wherein the soil wetting agent is a powder.

6. The soil wetting agent of claim 1, wherein the polymeric dispersant is selected from an anionic polyacrylate carboxylate copolymer, an anionic styrene acrylic acid copolymer, an anionic alkylnaphthalene sulfonate condensate polymer, a sodium alkyl naphthalene sulfonate, a polyvinyl pyrrolidone copolymers, or a combination of two or more thereof.

7. The soil wetting composition of claim 1, wherein the pH adjuster is selected from a carboxylic acids, a hydroxyl acid, a phosphoric acid, or a combination of two or more thereof.

8. The soil wetting composition of claim 1, wherein the sugar is selected from lactose, maltose, maltodextrin, galactose, xylose, or a combination of two or more thereof.

9. The soil wetting composition of claim 1, wherein the carrier resin is selected from a urea formaldehyde resin.

10. The soil wetting composition of claim 1, wherein the siloxane alkoxylate (a) is present in amount of from about 5 wt. % to about 60 wt. %; the polymeric dispersant (b) is present in an amount of from about 1 wt. % to about 10 wt. %; the pH adjuster (c) is present in an amount of from about 0.1 wt. % to about 5 wt. %; the sugar (d) is present in an amount of from about 5 wt. % to about 15 wt. %; and the carrier resin (e) is present in an amount of from about 20 wt. % to about 50 wt. %, and the wt. % is based on the total weight of the soil wetting composition.

11. A soil composition comprising the soil wetting agent of claim 1.

12. An agrochemical composition comprising the soil wetting agent of claim 1.

13. The agrochemical composition of claim 12, comprising a fertilizer.

14. A method of treating an agricultural area by applying the soil wetting agent of claim 1, to an area of the agricultural area.

15. The method of claim 14 comprising applying water to the agricultural area.

16. The method of claim 15, wherein from about 10% to about 70% less water is applied to the agricultural area than is required in the absence of the soil wetting agent.

17. A method of treating an agricultural area by applying the agrochemical composition of claim 12 or 13 to an area of the agricultural area.

18. The method of claim 17 comprising applying water to the agricultural area.

19. The method of claim 18, wherein from about 10% to about 70% less water is applied to the agricultural area than is required in the absence of the soil wetting agent.

* * * * *